Patented Nov. 17, 1936

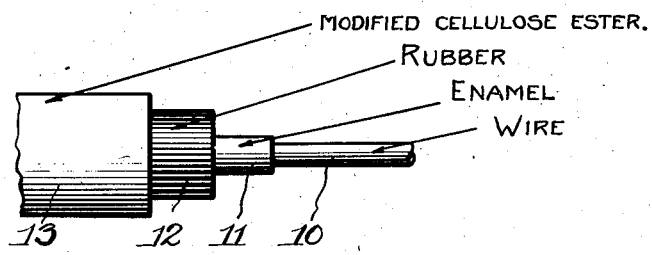
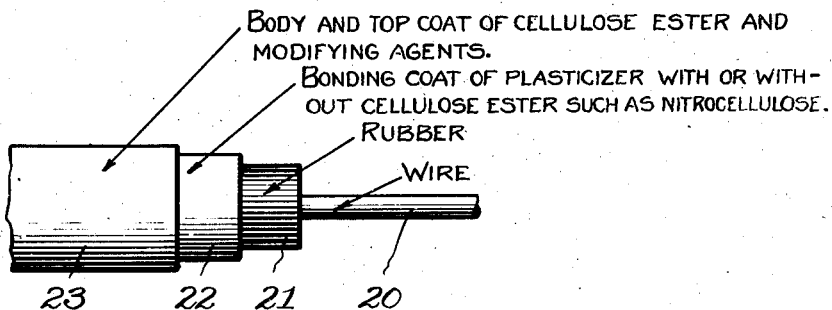
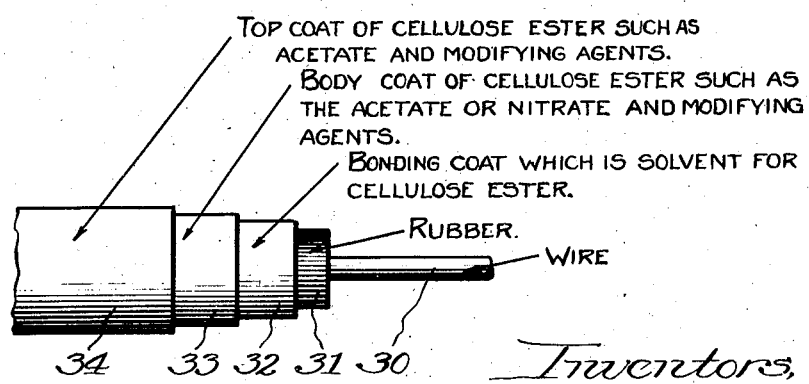

2,061,528

UNITED STATES PATENT OFFICE 2,061,528

ELECTRICAL INSULATION

Elmer W. Trolander and William Courtney Wilson, Chicago, Ill., assignors to Pyroxylin Products, Inc., Chicago, Ill., a corporation of Illinois Application May 2, 1931, Serial No. 534,612

8 Claims. (Cl. 173—264)

The present invention relates to electrical insulation and in particular to insulation wherein a protected rubber is used as an insulating material. More particularly our invention relates to an insulating structure in which the rubber is provided with a tightly adherent protective coating having cellulose esters as an essential component. It also relates to electrical conductors enclosed in rubber having a surface protected with such a coating.

Rubber is by far the most practical form of electrical insulation, particularly for wiring because of its well known chemical, electrical and physical properties. For many purposes, however, rubber insulation is not entirely satisfactory. For example, it is greatly affected by the action of hydrocarbons, and especially the petroleum hydrocarbons, such as lubricating oils, gasoline, etc. A particular weakness of rubber is its tendency to oxidize and especially its reactivity with ozone to form ozonides. The desirable properties of rubber, such as its elasticity, high dielectric strength, its freedom from cracks or fissures, its waterproof character, etc., are slowly lost on aging. Oxidation from air is slow but progressive, and contributes to aging. In the presence of ozone the deterioration goes on at an extremely fast rate, so that in from 1 to 10 minutes in the presence of ozone rubber insulation can be rendered practically useless.

The present invention aims to provide a laminated insulation structure in which ordinary insulation rubber or rubber composition is used as the basic insulation, which rubber or composition is provided with a tightly adhering film or coating including cellulose ester. The film or coating is electrically, mechanically and chemically appropriate for use without sacrificing any of the desired properties of the rubber. We also aim to provide a coating which is smooth, and which will protect the rubber against attack by harmful substances such as oils, including lubricating oils and gasoline, and gases such as air and ozone. We aim to provide a protective film which is tough and adherent, and which will permit the usual deformation of the insulation as by bending, twisting, etc., as on a wire, without injury to the film and without causing it to loosen from the rubber.

Another object of our invention is the provision of a structure which permits the use of thinner layers of rubber insulation for high tension or other apparatus.

Still another object is to provide a film coating that is highly flexible so that the outer coating or lamination may be flexed with the rubber without cracking or breaking, and without losing its adherence.

An important object of our invention is to provide a film coating on insulation rubber that is relatively inert and impervious to air, ozone, oxygen, oils and other substances that will injure the rubber, and that presents a face that is resistant to mechanical or other injury.

Still another object of the invention is the provision of a film coating on insulating rubber which has adherent properties on the face in contact with the rubber, and resistant properties on the exposed outer face.

Still another object of the invention is the provision of a composite film of several coatings over the rubber which composite film has in toto the desirable properties referred to above, and which has different properties in different zones, as at the adherent face and at the exposed face.

A particular object is the use of a bonding inner coat that adheres tightly to the rubber and an outer coating that is highly resistant to chemical or mechanical action. We also provide a composition which may be economically and easily applied, which has an attractive appearance, and which lends itself to modifications in appearance, such as being colored. We further provide an insulation structure having a tough, dry, non-tacky, smooth surface, so that dirt does not easily become embedded or lodged therein, and which may be easily cleaned, as for example, by wiping, or with soap and water without injury to the coating.

In our co-pending application Serial No. 534,611, filed May 2, 1931, which has matured to Patent No. 1,973,398 dated September 11, 1934, we have described in detail a process of coating rubber with a composition having cellulose esters as essential ingredients. The methods and compositions described therein may be used for coating insulating rubber compounds to secure an insulating structure having the desirable properties described above. There are certain precautions and modifications that should be observed in order to get the best results, as will be described hereinafter.

We have tried many materials in efforts to attain the objects of the present invention, and find that there are many difficulties in compounding and using common bases which one might assume would be satisfactory. Among the different base materials which we have used to compound a coating liquid and to test their properties in comparable tests are the following listed bases applied to one kind of rubber, against which are given the times required for the insulation to puncture at 14,000 volts, using as a test a copper post of 1-inch diameter wrapped with an insulated wire to be tested, and applying to the wire and the post a measured potential difference. A corona discharge in the air is thus formed producing ozone. The conductor so tested has a ⅛-inch thickness of rubber insulation.

Table No. 1

| Test No. | Material | Time to rupture |
| --- | --- | --- |
|  |  | Minutes |
| 1 | Blank—No film | 8.5 |
| 2 | Blank—No film | 8.0 |
| 3 | Blank—No film | 9.0 |
| 4 | Phenol-aldehyde resin | 17.0 |
| 5 | Rubber varnish (oil base) | 10.0 |
| 6 | Oil base varnish | 10.0 |
| 7 | Shellac | 910.0 |
| 8 | Glyptol resin (phthalic acid anhydride-glycerol) | 9.0 |
| 9 | Cellulose ester composition | 1800.0 to 6000 |

At a potential of 30,000 volts under the described conditions our rubber-cellulose ester composition insulating structure of test No. 9 has stood up for several hours, whereas the insulation described under tests 1 to 8 punctured in a few seconds (excluding shellac). At 14,000 volts samples like test No. 9 have been run 9 hours a day for a week or more without breakdown, and at a total of over 100 hours the coating has remained unpunctured.

The foregoing table shows the inefficiency of certain base materials. Shellac has desirable electrical properties, but inasmuch as shellac is adversely affected by water and other materials, lacks sufficient flexibility, or becomes tacky when plasticized sufficiently to enable it to bend with the rubber, we desire to exclude it from the scope of our invention as a base material, but we do not exclude it, or the other materials as modifying agents for our cellulose ester base, where certain physical or chemical properties of those materials are desirable, as may appear hereinafter.

In the accompanying drawing Fig. 1 represents a rubber coated wire or cable protected by a film embodying the invention.

Fig. 2 represents the film of Fig. 1 as embodying a bonding layer attached to the rubber, and an outer layer.

Fig. 3 represents the outer layer of Fig. 2 as embodying a middle or body layer and a top or exposed layer.

Cellulose esters, such as the nitrate and the acetate, are not of themselves suitable as our film material. Each lacks the requisite mechanical properties for the purpose. They are not sufficiently flexible even in thin layers. They have poor adherence to rubber, especially to compounds used as insulating rubber. It is to be understood that where we refer to "rubber" in this description and in the claims, we aim to include the usual rubber-containing composition used for insulating purposes, using the term "rubber" broadly in that respect.

We add modifying agents to the cellulose ester base in order to impart desired properties. We prefer to have different compositions with different properties for the different parts and functions of the film of our invention.

Our preferred insulation structure is made up of a layer of rubber over the electrical conductor, which conductor may have other thin coatings such as enamel applied directly thereto, such enamelled wire being an article of commerce which is well known. Directly on the rubber, we prefer to apply a bonding coat of such a composition as to adhere to the rubber, and to have the flexibility desired. As an external coat, we employ a cellulose ester base and modifiers which impart flexibility, and produce a surface that is resistant to mechanical and chemical injury. Instead of using only a bonding coat and a surface coat, we may employ different compositions between these two coats, which may be referred to as intermediate or body coats. Several forms are shown in the drawing.

In Fig. 1 a wire 10, which may be solid or stranded, and which may be with or without an enamel coating 11, is covered with a layer of insulating rubber composition 12. Attached to and about the rubber 12 is shown a single film 13 of cellulose ester base. This may be of a single homogeneous composition as above described, or it may include several compositions in laminated relation, integrally united.

In Fig. 2, a wire 20 is coated with rubber 21. Anchored to this is an especially adherent composition 22, as a bonding coat, such as that disclosed in examples Nos. 1, 2 and 3, hereinafter appearing. About the bonding coat 22 there is a cellulose ester base surface coat 23, such as the compositions disclosed in examples Nos. 4 to 8.

In Fig. 3 a wire 30 is covered with a rubber insulation 31. This is covered with a bonding coat 32. Upon this is an intermediate or body coat 33 containing a cellulose ester such as nitrate or acetate. Over the intermediate coat 33, there is applied a top or surface coat 34, preferably of good mechanical qualities, such as the acetate composition of Example 8.

Rubber, as on a wire or cable, may be coated with various combinations of the various compositions as above given, or as modified in various ways.

In making our insulation structure, we first apply to the conductor a suitable rubber containing insulation compound of the thickness desired, noting the fact that this invention permits thinner coatings than the prior art. For coating wires, for example, the rubber compound may be extruded about the wire before vulcanization. Such compounds and the methods of applying them to conductors are well known in the art and need not be described here, since we have found that substantially any commercial rubber insulation compound applied by any convenient method is useful for our purpose. In general, however, it is preferable that the rubber insulating compound be relatively free from paraffin, since the presence of paraffin in the rubber retards the evaporation of solvents used for the cellulose-ester-containing coats or laminations. It is also desirable, especially, where decorative effects are to be secured, that the rubber be relatively free from substances, such for example as asphaltic materials, that will bleed out into the outer coating or coatings and cause injury or discoloration.

To protect the rubber insulation in the manner described, we apply on the outer or exposed surface thereof, an adherent coating or coatings of cellulose ester base. We have been able to secure better adherence between the rubber and its cellulose ester base coating and better flexibility and better surface characteristics by the use of separately deposited films of different composition. We prefer, therefore, to use a special bonding coat, over which we apply a mechanically stronger cellulose ester body or surfacing coat.

Since there is a considerable latitude both in the choice of materials used and in the proportions used, we will describe in general terms a preferred method of securing adherence to rubber and flexibility in our compositions and then illustrate by means of specific examples.

For the bonding coat, for direct application on the rubber or rubber composition, we prefer to use a material that is relatively low in content of cellulose ester and relatively high in content of plasticizer as compared, say, to the usual types of cellulose ester compositions such as lacquers. In some cases, we may dispense entirely with the cellulose ester. The cellulose ester content of this bonding coat may be formed initially or be increased later by diffusion of cellulose ester from subsequent coats into the bonding coat. We have found in general that materials which act as plasticizers for and are compatible with cellulose esters are best suited as raw materials for a bonding coat on the rubber insulation. Thus, for example, as the non-volatile constituents of the bonding coat, we may use various proportions of solvent and non-solvent plasticizers, or of solvent or semi-solvent plasticizers, preferably with a relatively low proportion of the cellulose ester. A solvent plasticizer is a substantially non-volatile ingredient which functions as a softener or plasticizer and which has solvent powers for the cellulose ester with which it is used.

In general, we have found that a good bonding coat should contain less than 35% of cellulose ester. Where the rubber composition contains a relatively high proportion of rubber, good results are obtained where as little as 5% or even less of cellulose nitrate or acetate is used in the non-volatile composition of the bonding coat.

The bonding coat may be of such a nature as to be quite tacky or sticky after the solvent has evaporated. For example, where the cellulose ester plasticizer is of such a nature as to be capable of holding the cellulose ester in solution as where there is present a sufficient amount of solvent plasticizer, the composition will be relatively soft or even tacky. A certain amount of tackiness seems to be desirable, and for this reason we prefer to use relatively large proportions of materials that may be classed as "solvent plasticizers". The esters of phthalic acid, dibutyl tartrate, tricresyl phosphate, etc., are suitable as solvent plasticizers for nitro-cellulose. The toluene sulfonamids are suitable solvent plasticizers for cellulose acetate. Castor oil and rape seed oil illustrate non-solvent plasticizers, but the materials properly included in these classes are well known and need not be included here.

Since, as has been shown above, a certain amount of tackiness may be desirable in the bonding coat, we prefer to use sufficient solvent plasticizer purposely to render the resulting bonding coat tacky after the evaporation of the solvent. We may, for example, use a cellulose ester and a non-solvent plasticizer and then add sufficient solvent plasticizer to render the product tacky or we may use only cellulose ester and a sufficient amount of solvent plasticizer to form a mixture that is tacky when free from volatile solvent.

One type of plasticizer which we have found especially satisfactory consists of certain soft or balsam-like resinous materials which are compatible with the particular cellulose ester that is being used. Such resins may be considered as plasticizers for the cellulose esters since they impart softness and/or flexibility when used in combination with the cellulose esters. Where such resinous products are used, a less amount of solvent plasticizers may be used, since the resinous material itself may be tacky in nature or in the composition may contribute to the tackiness. Such soft resinous products may be used alone, or in admixture with solvent or non-solvent plasticizers as a bonding coat. Where such resins are used, a relatively low proportion or an absence of cellulose ester may be advantageous in the coating composition, especially for the purer forms of rubber, since in general, adherence decreases with an increase of the cellulose ester content.

The bonding coat may be applied by any convenient method, but we prefer to dissolve the non-volatile constituents in volatile solvent, and apply the solution to the surface of the rubber. The solvent should be of such composition as to hold all of the non-volatile constituents in solution until all of the solvent has evaporated. It should preferably contain a sufficient amount of rubber solvents or softeners to have some solvent or penetrating action on the rubber. For this purpose the hydrocarbons, such as toluene, benzene, hexalin, naphtha, and the like are useful. By providing a solvent that has some solvent or penetrating action on the rubber, the surface of the rubber is somewhat softened and it is probable that there is a certain amount of diffusion between the bonding coat and the rubber itself. In order to encourage this diffusion it is preferable to use a solution of relatively low viscosity. A solution having a viscosity of 0.1 to 1.5 poises is satisfactory, although solutions having much higher or lower viscosities may be used under some conditions. The low viscosity may be obtained, and the viscosity regulated, by increasing the ratio of solvent to non-volatile constituents, and/or by the choice of a low viscosity cellulose ester.

In general it is more difficult to secure good adherence between a cellulose ester coating and the surface of a rubber composition containing a high percentage of rubber than with compositions containing relatively large percentages of filler, as for example, zinc oxide, clay and the like. Thus, on pure rubber we prefer to use a bonding coat that is very low in cellulose esters, or that may of itself contain no cellulose ester. In this way the rubber may be given a bonding coat of a solvent plasticizer for cellulose ester, or a mixture of solvent and non-solvent plasticizers for cellulose ester, or of a soft balsam-like resinous material such as modified glycerol phthalic acid resins such as those which are plastic at 70° F. or other soft non-volatile polymerized products which act as softening agents for the cellulose ester employed in subsequent coats. We may also, of course, use a relatively small amount of cellulose ester in a bonding coat on pure rubber. In general, we prefer that the non-volatile constituents of a bonding coat to be used on rubber compounds that are highly flexible and have a relatively high percentage of rubber, should contain only from zero to 15% or 20% cellulose ester, if a high degree of adherence is to be secured. We have been able to secure a high degree of adherence and flexibility by the use of a sufficient proportion of solvent plasticizer in the bonding coat to render it capable of dissolving, or holding in solution the cellulose ester that is applied directly on the bonding coat. In some cases it is preferable that the bonding coat be capable of penetrating or softening, at least to a slight degree, the surface of the rubber.

On conductors that are less flexible and where the rubber insulating compound contains relatively large proportions of filling materials, as for example, zinc oxide, clay, etc., larger proportions of cellulose ester may be used, and in some cases, a bonding coat may be dispensed with entirely as is explained hereinafter.

To illustrate our invention as it relates to the bonding composition, we give the following examples, without, however, limiting this phase of our invention to or by these illustrative examples, which are merely exemplary of the principles involved.

*Example 1*

| Bonding composition | Parts by weight |
| --- | --- |
| Regular soluble cellulose nitrate, such as ½ sec. cotton | 15 |
| Modified phthalic acid glycerol resin having plasticity prescribed | 21.6 |
| Castor oil | 9 |
| Dibutyl phthalate | 8 |

*Example 2*

| Bonding composition | Parts by weight |
| --- | --- |
| Regular soluble cellulose nitrate | 35 |
| Low melting resin, such as the synthetic "Paraplex" | 90 |
| Castor oil | 44 |
| Diamyl phthalate | 30 |

*Example 3*

| Bonding composition | Parts by weight |
| --- | --- |
| Diethoxyethyl phthalate | 24 |
| Blown castor oil | 16 |

The compositions above given may be put into solution by use of a suitable solvent or solvent mixture, such as

| | |
| --- | --- |
| Toluene | 135 |
| Butanol | 35 |
| Ethyl alcohol | 55 |
| Butyl acetate | 55 |
| Ethyl acetate | 65 | which may constitute about 70 to 90% of the coating solutions. The strength may of course be varied depending upon the viscosity desired, and in view of the method of application. It may be applied by brushing, spraying, or by dipping. Articles like wire may be run through a solution and removed therefrom through an orifice which determines a thickness of coating. One or more bonding coats of the same or of different compositions may be applied in one or more distinctive manners.

When a proper bonding coating has dried by the evaporation of solvents, a very flexible adherent coating remains on the rubber. This is useful as an anchor for succeeding application of a cellulose ester composition which need not be compounded for adherence to rubber like the initial bonding coat.

We prefer to develop mechanical strength and a strong tough surface in the composition that is used for an intermediate or an outside coat. These coatings include as their important functional constituent, a cellulose ester base and a plasticizer. We may also, of course, employ modifying agents such as pigments, dyes, non-plasticizing resins, etc., depending upon the final result that is to be obtained.

The proportion of cellulose ester in the coats applied over the bonding coat is preferably higher than in the bonding coat itself. These coats may be designed to meet specific conditions. For example, for rigid conductors, the surface coating advantageously may contain up to 60% or even more cellulose ester, the remainder being plasticizing agents, resins, pigments and the like. For conductors that are to be deformed or flexed, a greater proportion of plasticizer is required. Where high resistance to oxidation and especially where ozone may be present, as for example, on high tension electrical conductors, we prefer to use a composition containing as much cellulose ester as possible, together with a sufficient amount of plasticizer to give the required flexibility, and/or distensibility. In other words the use of hard resins, drying oils and the like should be avoided. Either the cellulose nitrate or cellulose acetate may be employed. The outer coating (or coatings) differs from the bonding coat largely in the character of combinations and in the proportions, and may vary from the following typical and illustrative examples.

*Example 4*

| Body coating | Parts by weight |
| --- | --- |
| 20 to 30 second regular soluble nitrocellulose | 40 |
| Dibutyl phthalate | 14 |
| Castor oil | 68 |

*Example 5*

| Body coating | Parts by weight |
| --- | --- |
| 20 to 30 second regular soluble nitrocellulose, dry | 40 |
| Dibutyl phthalate | 12 |
| Castor oil | 60 |
| Modified phthalic acid anhydride glycerol resin of low melting point | 10 |

*Example 6*

| Body coating | Parts by weight |
| --- | --- |
| Nitrocellulose, dry | 63 |
| Tricresyl phosphate | 30 |
| Diamyl phthalate | 25 |
| Castor oil | 9 |

*Example 7*

| Body coating | Parts by weight |
| --- | --- |
| Nitrocellulose | 84 |
| Soft nitrocellulose plasticizing resin | 103 |
| Green pigment | 10 |

*Example 8*

| Body or top coating | Parts by weight |
| --- | --- |
| Cellulose acetate | 50 |
| Ethylated toluene sulfonamid | 45 |
| Toluene methylene sulfonamid | 15 |
| Tricresyl phosphate | 10 |

By designating Examples Nos. 1, 2 and 3 as "Bonding coatings" and examples Nos. 4 to 8 as "Body coating" or as "Body or top coating" we do not draw a distinct line of division precluding the use of any one type as another type. We wish to make it clear that one or more modifications may be made in any formula to alter the properties to meet specific conditions.

We may also employ coats of different compositions between the bonding coat and the surface coat, which may be referred to as intermediate coats, as illustrated in Fig. 3. We may also employ nitrocellulose in the bonding coat and cellulose acetate in the surface coat, or in an intermediate coat and other such variations as will be readily apparent to those skilled in the art.

As modifying agents for the various special purposes, some of which are above referred to, we may select resins, either natural or synthetic, plasticizers, stabilizing agents, emollients, etc. Coloring materials such as dyes and pigments may be incorporated in any or all of the coating compositions. It is to be understood that we permit ourselves considerable latitude in compounding our coating compositions. This is due in part to the variety of modifying agents which are available. It is also due in part to the requirements of a particular instance. While we desire generally the same properties in various forms of our film, and in the various coatings which may be comprised by it, the degrees of two exemplary properties in one film may be varied in different directions relative to the same properties, in another film. This will be readily understood by reference to a small sized wire and to a larger sized wire. The smaller wire may be bent to sharper angles than a large one, but in bending the larger one the stretch is greater and the angle of bend is less. The films may be varied in the mechanical properties to accentuate one or more properties as required by usage.

Tests for results similar to those given in Table 1, may be made to determine the excellency of a particular composition or combination. For a standard test we have employed 18 strands of 28 gauge copper wire conductor of constant size in the different tests. About this is formed a ⅛ inch thickness of insulating rubber compound. Various thicknesses of ester film are then placed on the rubber. The film-protected rubber-insulated wire is then wrapped about a standard sized copper post, say 1 inch in diameter. A transformer delivering 14,000 volts is employed, and the post and wire are attached to the high voltage terminals. The time for break down of the insulation is recorded.

The tests demonstrate the value and efficiency of cellulose ester over other materials which are not workable for unknown reasons. This is particularly true for high tension apparatus where destructive conditions for rubber are most pronounced. The tests demonstrate that unprotected rubber breaks down completely in less than 10 minutes. The insulating material of this invention lasts from 200 to about 600 times as long under the tremendous forces of this test. Because of the short life of the unprotected rubber it is obvious that any short application of high tension, such as lightning, or exposure to stressed electric conditions, as may exist in the atmosphere at various times, always subjects unprotected rubber about conductors to deteriorating conditions. Several lightning strikes, or exposure to stray tensions, may seriously affect the life of unprotected rubber insulation, and since practically all electrical apparatus is subject to such conditions, the present invention is useful in all electrical apparatus, whether or not such apparatus is designed for or is to be used especially for high tension work.

The effective protection afforded by the film of the present invention permits reduction in the thickness of rubber used as insulation in ordinary as well as in high tension conductors. The electrical properties are increased. The life of the rubber is prolonged, and chemical action on the rubber is largely averted by the protective action of the film.

The invention provides a coating for rubber which is particularly effective against high tension, against ozone, air, oils, greases, gases, etc. It is economically made and more cheaply applied than woven fabrics or other threads or fibers. The film is smooth, and glossy, and therefore is easily handled. It picks up little floating dust and dirt; it is easily cleaned by merely wiping. It may be colored attractively where it is desired for identification or for ornamental purposes.

We do not consider that wires or cables are the only embodiments of our invention. We consider the protected rubber as a new insulating structure and as a new insulating material, having new and distinctive properties over and above unprotected rubber. Therefore, in the accompanying claims we define the invention broadly as such, and contemplate such changes and modifications as we have herein indicated as possible, and such other changes and modifications as will naturally occur to those skilled in the art.

In the foregoing and in the appended claims for convenience and to avoid confusion, we have referred to the entire material over the rubber as a "film", and to the different components of that film as "coats" or "coatings", or "layers".

Our issued Patent No. 1,973,398 is generic to our present invention herein claimed specifically with reference to the acetate type of ester in the surface coating.

We claim:

1. An electric insulation comprising an insulating body of rubber, a bonding coating of a nitrocellulose base containing solvent plasticizer whereby the coating is firmly adherent to the rubber, and a protective coating of cellulose acetate base on said first coating, said two coatings being united into a unitary film.

2. An insulating sleeve for a conductor comprising a tubular sleeve of insulating rubber, and an adhering surface film for the exposed surface of said sleeve comprising an inner layer and a superimposed adherent layer of plasticized cellulose nitrate, the inner layer being adherent to the rubber sleeve and containing not over 35% of cellulose nitrate and plasticizing agent as the predominating constituent of the remaining 65% or more, and an outer layer having more than 35% of organic acid derivative of cellulose and less than 65% of plasticizer.

3. An insulating sleeve for a conductor comprising a tubular sleeve of insulating rubber, and an adhering surface film for the exposed surface of said sleeve comprising an inner layer and a superimposed adherent layer of plasticized cellulose nitrate, the inner layer being adherent to the rubber sleeve and containing not over 35% of cellulose nitrate and plasticizing agent as the predominating constituent of the remaining 65% or more, and the outer layer having more than 35% of cellulose acetate and less than 65% of plasticizer.

4. An electrical insulation comprising an insulating rubber and an adhering film for the exposed surface of said rubber, said film comprising an inner layer and a super-imposed adherent layer of plasticized cellulose ester, the inner layer comprising a cellulose nitrate and a substantially non-volatile plasticizer capable of dissolving the cellulose ester of both coatings, said plasticizer and cellulose nitrate being in such proportions as to form a sticky tacky composition, and the outer layer comprising a non-tacky cellulose acetate base composition.

5. An electrical insulation comprising an insulating rubber and an adhering surface film for the exposed surface of said rubber, said film comprising a plasticized inner layer and a superimposed adherent layer of cellulose acetate base, the inner layer consisting of a base of cellulose nitrate and a mixture of non-solvent and solvent plasticizer, said solvent plasticizer being present in sufficient proportions to cause said mixture to become capable of dissolving the cellulose acetate of the said superimposed layer.

6. An electric insulation comprising an insulating body of rubber, a bonding coating of a nitrocellulose base containing solvent plasticizer whereby the coating is firmly adherent to the rubber, and a protective coating of cellulose acetate base on said first coating, the nitrocellulose coating containing plasticizer for cellulose acetate, whereby said two coatings are united into a unitary film.

7. An oil-resistant electric insulation for an electrical conductor comprising insulating rubber, a soft adhesive coating adjacent to the rubber including a solvent plasticizer for nitrocellulose, an intermediate coating containing nitrocellulose, and a cellulose acetate base coating on said intermediate coating, the three coatings being united as a protective film adherent to said insulating rubber.

8. An oil-resistant electric insulation for an electrical conductor comprising insulating rubber, a soft adhesive coating adjacent to the rubber including a solvent plasticizer for nitrocellulose, a nitrocellulose base intermediate coating including a plasticizer that is a solvent for cellulose acetate, and a cellulose acetate base coating on said intermediate coating, the three coatings being united as a protective film adherent to said insulating rubber.

ELMER W. TROLANDER.
WILLIAM COURTNEY WILSON.